(12) United States Patent
Li et al.

(10) Patent No.: US 10,748,054 B2
(45) Date of Patent: Aug. 18, 2020

(54) TWO-DIMENSIONAL CODE INFORMATION QUERY METHOD, SERVER, CLIENT, AND SYSTEM

(71) Applicant: ALIBABA GROUP HOLDING LIMITED, Grand Cayman (KY)

(72) Inventors: Lizhong Li, Hangzhou (CN); Xuanpeng Zhang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 15 days.

(21) Appl. No.: 16/240,498

(22) Filed: Jan. 4, 2019

(65) Prior Publication Data

US 2019/0138877 A1    May 9, 2019

Related U.S. Application Data

(63) Continuation of application No. PCT/CN2017/090271, filed on Jun. 27, 2017.

(30) Foreign Application Priority Data

Jul. 8, 2016 (CN) .......................... 2016 1 0539525

(51) Int. Cl.
*G06F 16/00* (2019.01)
*G06F 16/903* (2019.01)
(Continued)

(52) U.S. Cl.
CPC .............. *G06K 19/10* (2013.01); *G06F 16/00* (2019.01); *G06F 16/90335* (2019.01); *G06K 19/06037* (2013.01)

(58) Field of Classification Search
CPC .............. G06K 19/10; G06K 19/06037; G06F 16/90335; G06F 16/00
See application file for complete search history.

(56) References Cited

U.S. PATENT DOCUMENTS 7,886,978 B2 * 2/2011 Ofek ........................ G06K 7/14
235/462.1
8,407,142 B1 3/2013 Griggs
(Continued)

FOREIGN PATENT DOCUMENTS

| AU | 2010204567 A1 | 8/2011 |
|---|---|---|
| CN | 102496043 A | 6/2012 |

(Continued)

OTHER PUBLICATIONS

Visualead. "All in one QR code" Apr. 13, 2013. (Year: 2013).*
(Continued)

*Primary Examiner* — Thien M Le
*Assistant Examiner* — Asifa Habib
(74) *Attorney, Agent, or Firm* — Sheppard Mullin Richter & Hampton LLP

(57) ABSTRACT

A two-dimensional code query method includes receiving a two-dimensional code query request from a first client, the two-dimensional code query request containing a first two-dimensional code, obtaining at least one two-dimensional codes that are bound to the first two-dimensional code, and returning the obtained two-dimensional codes to the first client for the first client to extract information from at least one of the obtained two-dimensional codes with a corresponding application on the first client.

12 Claims, 6 Drawing Sheets

(51) Int. Cl.
*G06K 19/06* (2006.01)
*G06K 19/10* (2006.01)

(56) References Cited

U.S. PATENT DOCUMENTS

| | | | |
|---|---|---|---|
| 8,573,499 B1* | 11/2013 | Boyle | G06F 16/9554 235/462.09 |
| 8,935,339 B2 | 1/2015 | Cheng et al. | |
| 9,122,377 B2 | 9/2015 | Jeon et al. | |
| 9,218,557 B2 | 12/2015 | Spodak et al. | |
| 9,760,645 B1* | 9/2017 | Park | G06K 19/06037 |
| 2006/0224454 A1 | 10/2006 | Kantor et al. | |
| 2010/0057580 A1 | 3/2010 | Raghunathan | |
| 2011/0179113 A1 | 7/2011 | Thomas | |
| 2012/0209688 A1 | 8/2012 | Lamothe et al. | |
| 2012/0215605 A1 | 8/2012 | Gardner et al. | |
| 2012/0256000 A1* | 10/2012 | Cok | G06K 7/1447 235/462.22 |
| 2013/0162400 A1 | 6/2013 | Nikolaus et al. | |
| 2014/0346231 A1 | 11/2014 | Al-Omari et al. | |
| 2016/0117487 A1* | 4/2016 | Amacker | G06K 19/06112 235/375 |
| 2016/0171427 A1 | 6/2016 | Cao | |
| 2016/0335653 A1 | 11/2016 | Bodington | |
| 2017/0243097 A1* | 8/2017 | Loy | G06K 19/06037 |
| 2017/0249492 A1 | 8/2017 | Lu | |
| 2017/0344321 A1 | 11/2017 | Li et al. | |
| 2017/0357726 A1* | 12/2017 | Pan | G06Q 30/00 |

FOREIGN PATENT DOCUMENTS

| | | | |
|---|---|---|---|
| CN | 102737318 | A | 10/2012 |
| CN | 103945268 | A | 7/2014 |
| CN | 105491008 | A | 4/2016 |
| CN | 105654006 | A | 6/2016 |
| CN | 105701659 | A | 6/2016 |
| CN | 106874809 | A | 6/2017 |
| CN | 105069363 | B | 5/2018 |
| JP | 2014-229299 | A | 12/2014 |
| TW | 201621750 | A | 6/2016 |
| TW | 201624303 | A | 7/2016 |
| WO | 2010037204 | A1 | 4/2010 |
| WO | 2016107400 | A1 | 7/2016 |
| WO | 2019105296 | A1 | 6/2019 |

OTHER PUBLICATIONS

First Search for Chinese Application No. 201610539525.1 dated Sep. 19, 2019 (1 page).
First Office Action for Chinese Application No. 201610539525.1 dated Sep. 29, 2019 with English machine translation (21 pages).
First Seach for Taiwanese Application No. 106118718, dated Jan. 20, 2020, 1 page.
Second Office Action for Chinese Application No. 201610539525.1, dated Jan. 10, 2020, 26 pages.
Extended Search Report for European Application No. 17823536.2, dated Jan. 16, 2020, 9 pages.
Notice of Reason for Rejection for Japanese Application No. 2019-500350, dated Jan. 7, 2020, 5 pages.
Mayrhofer A: "ENUM Service 'vCard'", Internet Citation, Nov. 8, 2005 (Nov. 8, 2005), XP002389077, Retrieved from the Internet,URL: www3.ietf.org/proceedings/05nov/slides/enum-3/enum-3.ppt.
"vCard—Wikipedia, the free encyclopedia", Dec. 30, 2010 (Dec. 30, 2010), XP055166870, Retrieved from the Internet, URL: http://en.wikipedia.org/w/index.php?title=VCard&oldid=405000638.
Notice of Allowance for Korean Application No. 10-2019-7003502, dated Feb. 27, 2020, 3 pages.
International Preliminary Report on Patentability Chapter I for PCT Application No. PCT/CN2017/090271 dated Jan. 17, 2019 (10 pages).
International Search Report and the Written Opinion dated Sep. 30, 2017, issued in related International Application No. PCT/CN2017/090271 (9 pages).

* cited by examiner

TWO-DIMENSIONAL CODE INFORMATION QUERY METHOD, SERVER, CLIENT, AND SYSTEM

CROSS-REFERENCE TO RELATED APPLICATIONS

The present application is a continuation application of International Application No. PCT/CN2017/090271, filed on Jun. 27, 2017, which is based on and claims priority to and benefits of Chinese Patent Application No. 201610539525.1 filed with the State Intellectual Property Office (SIPO) of the People's Republic China on Jul. 8, 2016. The entire contents of the above-identified applications are incorporated herein by reference.

TECHNICAL FIELD

The present application relates to the technical field of image recognition, and in particular, to a two-dimensional code information query method, server, client, and system.

BACKGROUND

With the rapid development and extensive applications of terminal devices such as mobile phones, tablet computers, and the like, more and more users prefer to use terminal devices for daily work, life, and study. Accordingly, more and more social applications have been developed for terminal devices to facilitate daily work, life, and study.

At present, there are many common social applications for terminal devices. With client WeChat and Alipay as an example, when WeChat user A adds WeChat user B as a friend, WeChat user A can directly scan a two-dimensional code in WeChat user B by using the scan function in WeChat, and then WeChat user B is added to the friends; here, the two-dimensional code in WeChat user B comprises the user's identity information. Similarly, when Alipay user C adds Alipay user D as a friend, Alipay user C can directly scan a two-dimensional code in Alipay user D by using the scan function in Alipay, and then Alipay user D can be added to the friends; here, the two-dimensional code in Alipay user D comprises the user's identity information.

When WeChat user A scans the two-dimensional code in Alipay user C or Alipay user D by using the scan function in the WeChat client to identify the user's identity information, the WeChat client requests its corresponding WeChat server for user identity information of Alipay user C or Alipay user D. Since the WeChat server only has user identity information of WeChat users but does not have user identity information of users of other clients, WeChat user A would not be able to obtain the user identity information in the two-dimensional code in Alipay user C or Alipay user D at an Alipay client. In other words, when two-dimensional codes are scanned with the scan function in a client, only user identity information in two-dimensional codes corresponding to the same type of clients can be recognized, and cross-client recognition of user identity information in two-dimensional codes cannot be achieved. When two-dimensional codes are printed on a person's business cards in an exemplary application, two-dimensional codes corresponding to a variety of clients would all be printed on this person's business cards to ensure that all information could be included on the business cards, affecting the aesthetic design of the business cards.

SUMMARY

In light of this, embodiments of the specification provide a two-dimensional code information query method, server, client, and system with the main objective of solving the problem in current technologies that cross-client recognition of user identity information in two-dimensional codes cannot be achieved. To achieve the above objective, the specification provides the following technical solutions.

In a first aspect, the specification provides a two-dimensional code information query method, comprising:

receiving a two-dimensional code query request sent by a first client, the two-dimensional code query request containing a first two-dimensional code;

according to the first two-dimensional code, querying two-dimensional codes to obtain two-dimensional codes that are bound to the first two-dimensional code; and returning the obtained two-dimensional codes to the first client so that the first client displays the returned two-dimensional codes, and obtains corresponding two-dimensional code information by recognizing the two-dimensional codes with corresponding applications.

According to some embodiments, the method may further comprise binding the first two-dimensional code to other two-dimensional codes, which comprises:

receiving a two-dimensional code binding request sent by a second client, the two-dimensional code binding request containing the first two-dimensional code and at least one other two-dimensional code, and the first two-dimensional code and the at least one other two-dimensional code representing two-dimensional codes of the same user on different applications; and establishing a binding relationship between the first two-dimensional code and the at least one other two-dimensional code.

In a second aspect, the specification provides a two-dimensional code information query method, comprising:

receiving a binding operation instruction, the binding operation instruction comprising a first two-dimensional code and at least one other two-dimensional code to be bound with the first two-dimensional code, and the first two-dimensional code and the at least one other two-dimensional code representing two-dimensional codes of the same user on different applications;

generating a two-dimensional code binding request according to the first two-dimensional code and the at least one other two-dimensional code, the two-dimensional code binding request containing the first two-dimensional code and the at least one other two-dimensional code; and sending the two-dimensional code binding request to a server.

In a third aspect, the specification provides a server, comprising:

a first receiving unit configured to receive a two-dimensional code query request sent by a first client, the two-dimensional code query request containing a first two-dimensional code;

a querying unit configured to search for, according to the first two-dimensional code received by the first receiving unit, other two-dimensional codes bound to the first two-dimensional code;

a first sending unit configured to return the other two-dimensional codes found by the querying unit to the first client so that the first client displays the returned other two-dimensional codes, and obtains corresponding two-dimensional code information by recognizing the other two-dimensional codes with corresponding applications;

a second receiving unit configured to receive a two-dimensional code binding request sent by a second client, the two-dimensional code binding request containing the first two-dimensional code and at least one other two-dimensional code, and the first two-dimensional code and the at least one other two-dimensional code representing two-dimensional codes of the same user on different applications; and an establishing unit configured to establish a binding relationship between the first two-dimensional code and the at least one other two-dimensional code received by the second receiving unit.

In a fourth aspect, the specification provides a client, comprising:

a receiving unit configured to receive a binding operation instruction, the binding operation instruction comprising a first two-dimensional code and at least one other two-dimensional code to be bound with the first two-dimensional code, and the first two-dimensional code and the at least one other two-dimensional code representing two-dimensional codes of the same user on different applications;

a generating unit configured to generate a two-dimensional code binding request according to the first two-dimensional code and the at least one other two-dimensional code received by the receiving unit, the two-dimensional code binding request containing the first two-dimensional code and the at least one other two-dimensional code; and a sending unit configured to send the two-dimensional code binding request generated by the generating unit to a server.

In a fifth aspect, the specification provides a two-dimensional code information query system, comprising: a first client, a second client, and a server, wherein the second client is configured to receive a binding operation instruction, the binding operation instruction comprising a first two-dimensional code and at least one other two-dimensional code to be bound with the first two-dimensional code, generate a two-dimensional code binding request according to the first two-dimensional code and the at least one other two-dimensional code, and send the two-dimensional code binding request to the server; here, the first two-dimensional code and the at least one other two-dimensional code represent two-dimensional codes of the same user on different applications, and the two-dimensional code binding request contains the first two-dimensional code and the at least one other two-dimensional code;

the server is configured to receive the two-dimensional code binding request sent by the second client, and establish a binding relationship between the first two-dimensional code and the at least one other two-dimensional code;

the first client is configured to send a two-dimensional code query request to the server, the two-dimensional code query request containing a first two-dimensional code;

the server is further configured to receive the two-dimensional code query request sent by the first client, search for or search for other two-dimensional codes bound to the first two-dimensional code according to the first two-dimensional code, and return the obtained other two-dimensional codes to the first client; and the first client is further configured to receive and display the other two-dimensional codes returned by the server, such that corresponding two-dimensional code information is obtained by recognizing the other two-dimensional codes with corresponding applications.

In a further aspect, the present application provides a two-dimensional code query method comprising receiving a two-dimensional code query request from a first client, the two-dimensional code query request containing a first two-dimensional code, obtaining at least one two-dimensional codes that are bound to the first two-dimensional code, and returning the obtained two-dimensional codes to the first client for the first client to extract information from at least one of the obtained two-dimensional codes with a corresponding application on the first client.

In another further aspect, the present application provides a non-transitory computer-readable storage medium configured with instructions executable by one or more processors to cause the one or more processors to perform operations comprising receiving a two-dimensional code query request from a first client, the two-dimensional code query request containing a first two-dimensional code, obtaining at least one two-dimensional codes that are bound to the first two-dimensional code, and returning the obtained two-dimensional codes to the first client for the first client to extract information from at least one of the obtained two-dimensional codes with a corresponding application on the first client.

By the above technical solutions, the technical solutions provided by the embodiments of the specification at least have the following advantages:

According to the two-dimensional code information query method, server, client, and system provided by the specification, the server receives a two-dimensional code binding request sent by a second client, the two-dimensional code binding request comprising a first two-dimensional code and at least one other two-dimensional code, and establishes a binding relationship between the first two-dimensional code and the at least one other two-dimensional code; the server receives a two-dimensional code query request comprising the first two-dimensional code sent by a first client, searches for, according to the first two-dimensional code, other two-dimensional codes bound to the first two-dimensional code in the established binding relationship between the first two-dimensional code and the at least one other two-dimensional code, and returns all the obtained other two-dimensional codes to the first client, so that the first client displays the returned other two-dimensional codes. In the embodiments of the specification, the first two-dimensional code and the at least one other two-dimensional code in the server represent two-dimensional codes of the same user on different applications, the first two-dimensional code serves as an "index," and through one first two-dimensional code, the first client can obtain all other two-dimensional codes bound to the first two-dimensional code, thereby achieving "one code for multiple uses."

The description above is merely a brief summary of the technical solutions of the specification. To more clearly understand the technical means of the specification for implementation according to the description, and to make the above and other objectives, features, and advantages of the specification easier to understand, detailed implementation manners of the specification will be described below.

BRIEF DESCRIPTION OF THE DRAWINGS

By reading the detailed description of preferred implementation manners below, various other advantages and benefits will become clear to a person skilled in the art. The accompanying drawings are merely used for illustrating the preferred implementation manners and shall not be construed as limitations to the specification. In all the accompanying drawings, identical reference symbols are used to represent identical components. In the accompanying drawings.

DETAILED DESCRIPTION

Exemplary embodiments of the present disclosure will be described in more detail below with reference to the accompanying drawings. The accompanying drawings illustrate exemplary embodiments of the present disclosure, but it should be understood that the present disclosure can be implemented in various forms and shall not be limited by the embodiments described herein. Conversely, the embodiments are provided for more thoroughly understanding the present disclosure, such that the scope of the present disclosure can be fully conveyed to a person skilled in the art.

Figure 1:
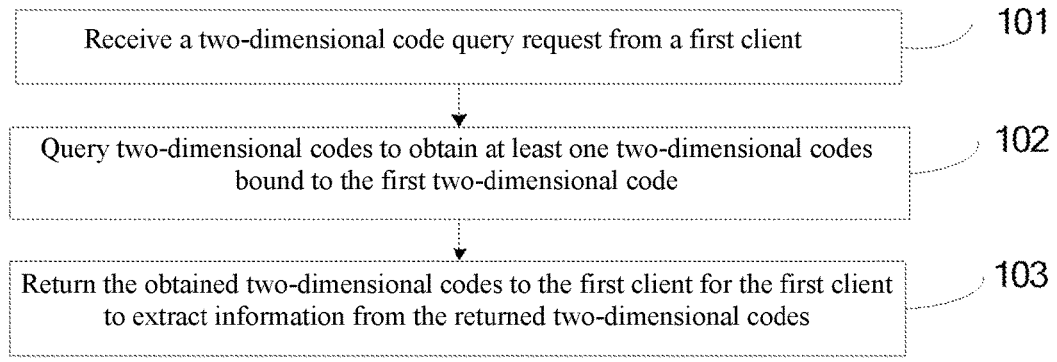
FIG. 1 is a flow chart of a two-dimensional code information query method according to some embodiments of the specification.

The embodiments of the specification provide a two-dimensional code information query method applied at the server side. As shown in FIG. 1, the method comprises:

Step 101. Receiving a two-dimensional code query request from a first client.

Functions of the server in the embodiments of the specification may be different from the functions of an application server corresponding to the first client. As a supplier of two-dimensional codes for the client, the application server corresponding to the client is used to store user IDs of users of this type of clients, and the user IDs are the unique identifiers of user identity information. Namely, different users of the same type of clients have different user IDs. The server in the embodiments of the specification does not belong to any two-dimensional code supplier, and the server is used to store two-dimensional codes on each application (APP) and a binding relationship between two-dimensional codes of the same user on different APPs. To facilitate differentiation of the application server corresponding to the client from the server in the embodiments of the specification, a third-party server will be used in description below to replace the server in the embodiments of the specification. However, it should be clear that this manner of description is not intended to limit the server in the embodiments of the specification only to a third-party server other than the application server. In an exemplary application, if an application server corresponding to the client has the functions of the server in the embodiments of the specification, then the application server corresponding to the client can also be referred to as the third-party server.

The first client invokes services via two-dimensional codes, establishes communication connection with a third-party server, and sends a two-dimensional code query request containing a first two-dimensional code to the third-party server so as to obtain all other two-dimensional codes bound to a first two-dimensional code. It should be noted that the type of the client corresponding to the first two-dimensional code may or may not be the same as that of the first client.

Step 102. According to the first two-dimensional code, searching for other two-dimensional codes bound to the first two-dimensional code.

Before the third-party server searches for other two-dimensional codes bound to the first two-dimensional code according to the first two-dimensional code received at the step 101, a binding relationship between the first two-dimensional code and other two-dimensional codes needs to be established.

The process in which the third-party server establishes a binding relationship between the first two-dimensional code and at least one other two-dimensional code is as follows:

A second client sends a two-dimensional code binding request to the third-party server via a two-dimensional code binding service, wherein the two-dimensional code binding request contains the first two-dimensional code and at least one other two-dimensional code, and the first two-dimensional code and the at least one other two-dimensional code represent two-dimensional codes of the same user on different applications; upon receiving the two-dimensional code binding request sent by the second client, the third-party server analyzes the two-dimensional code binding request to obtain the first two-dimensional code and the at least one other two-dimensional code, and establishes a binding relationship between the first two-dimensional code and the at least one other two-dimensional code. Here, the type of the second client may or may not be the same as that of the first client in the step 101. For example, both may be WeChat clients or may be clients of different types. Here, the second client and the first client in the step 101 are more intended to indicate clients of different users.

Upon receiving the two-dimensional code binding request information sent by the second client, the third-party server stores the first two-dimensional code and the at least one other two-dimensional code in a local database of the third-party server and establishes a binding relationship between multiple two-dimensional codes of the same users. For example, assuming that the two-dimensional code binding request sent by the second client contains a two-dimensional code a as the first two-dimensional code and a two-dimensional code 001 and a two-dimensional code C-01 as other two-dimensional codes, the third-party server first stores the two-dimensional code a, the two-dimensional code 001, and the two-dimensional code C-01 in a local database, as shown in Table 1. The two-dimensional code a, the two-dimensional code 001, and the two-dimensional code C-01 all belong to user A, and a binding relationship is established between the two-dimensional code a, the two-dimensional code 001, and the two-dimensional code C-01. It should be noted that, to facilitate expression, Table 1 provided by the embodiment of the specification illustrates relations between user, client, and two-dimensional codes in a table form. However, it should be clear that this manner of description is not intended to limit the presentation manner and detailed content of information stored on a server to the table form only in the embodiments of the specification.

TABLE 1

| | Third-party server | |
|---|---|---|
| User | Client | Two-dimensional codes |
| User A | Client I | Two-dimensional code a |
| | Client II | Two-dimensional code 001 |
| | Client III | Two-dimensional code C-01 |
| | ... | ... |
| User B | Client I | Two-dimensional code b |
| | Client II | Two-dimensional code 002 |
| | ... | ... |
| ... | ... | ... |

After the third-party server has established a binding relationship between the first two-dimensional code and the at least one other two-dimensional code, the third-party server searches for other two-dimensional codes bound to the first two-dimensional code according to the first two-dimensional code in the database. Referring to Table 1 again, and assuming that the first two-dimensional code is the two-dimensional code a, the third-party server searches for the two-dimensional code 001 and the two-dimensional code C-01 bound to the two-dimensional code a according to the two-dimensional code a.

Step 103. Returning the obtained two-dimensional codes from the result of the query or search to the first client so that the first client displays the returned other two-dimensional codes.

The third-party server returns all the obtained other two-dimensional codes having a binding relationship with the first two-dimensional code to the first client, the first client receives and displays all the other two-dimensional codes, and the other two-dimensional codes are recognized with corresponding applications to obtain corresponding two-dimensional code information. Here, a manner in which all the other two-dimensional codes are displayed may include, but is not limited to, the following manners, for example, page scroll, juxtaposed display, scroll up and down, and the like. The embodiments of the specification do not have limitations on the display manner in which the first client displays all the other two-dimensional codes.

Figure 2:
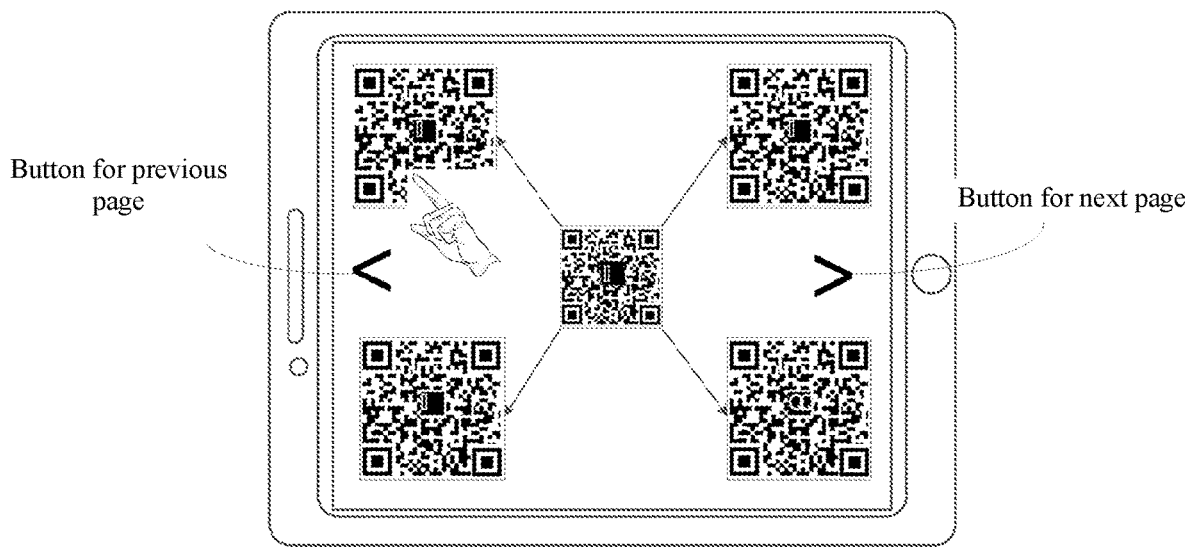
FIG. 2 is a schematic diagram of a two-dimensional code having a binding relationship with a first two-dimensional code according to some embodiments of the specification.

For example, FIG. 2 is a schematic diagram of a two-dimensional code having a binding relationship with the first two-dimensional code according to some embodiments of the specification. In the schematic diagram, the description for binding the two-dimensional codes is made by associating juxtaposed display mode and page scroll display mode. For example, assuming that user B uses a WeChat client installed on his/her tablet computer, the bound two-dimensional code invoking service in the WeChat client is turned on, communication connection is established with a third-party server based on the bound two-dimensional code invoking service, a two-dimensional code on a business card of user A is scanned with the camera, request information for obtaining other two-dimensional codes bound to the two-dimensional code on the business card is sent to the third-party server, and after the third-party server responds to the request information, all two-dimensional codes bound to the two-dimensional code on the business card of user A are outputted and displayed. Assuming that it is a WeChat two-dimensional code of user A on the business card and other two-dimensional codes bound to the WeChat two-dimensional code include an Alipay two-dimensional code, a Ding Talk two-dimensional code, a Taobao two-dimensional code, and a QQ two-dimensional code of user A, the two-dimensional codes returned by the third-party server may include: the Alipay two-dimensional code, the Ding Talk two-dimensional code, the Taobao two-dimensional code, and the QQ two-dimensional code of user A. If there are additional two-dimensional codes bound to the two-dimensional code on the business card, the user may trigger the paging button of the next page as shown in FIG. 2 to view other two-dimensional codes. The description above is merely exemplary, and the embodiments of the specification do not have limitations on display manners, displayed numbers, and the like for other two-dimensional codes in the first client.

After the first client displays other two-dimensional codes bound to the first two-dimensional code sent by the third-party server, the first client user determines a two-dimensional code corresponding to a client having the same type as that of the first client from the other two-dimensional codes according to the two-dimensional code identification information (the identification information is used to indicate whether a two-dimensional code is a WeChat two-dimensional code, an Alipay two-dimensional code, or a Ding Talk two-dimensional code), the identification information is used to identify the type of a client, and the first client user recognizes or extracts the identification information (corresponding user identity information) by long pressing the two-dimensional code. Namely, request information for obtaining user identity information of a two-dimensional code having the same type as that of the first client is sent to an application server corresponding to the first client, and after the application server corresponding to the first client responds to the request information, the first client displays the user identity information and adds the user as a friend as needed.

In an exemplary application, when the first client scans the first two-dimensional code through the bound two-dimensional code invoking service and if the third-party server determines that there is no two-dimensional code associated with or bound to the first two-dimensional code, the third-party server will return prompt information that the first two-dimensional code does not have associated two-dimensional code to the first client, so that the user is prompted.

According to the two-dimensional code information query method provided by the embodiments of the specification, the server receives a two-dimensional code binding request sent by a second client, the two-dimensional code binding request comprising a first two-dimensional code and at least one other two-dimensional code, and establishes a binding relationship between the first two-dimensional code and the at least one other two-dimensional code; the server receives a two-dimensional code query request comprising the first two-dimensional code sent by a first client, searches for, according to the first two-dimensional code, other two-dimensional codes bound to the first two-dimensional code in the established binding relationship between the first two-dimensional code and the at least one other two-dimensional code, and returns all the obtained other two-dimensional codes to the first client, so that the first client displays the returned other two-dimensional codes. In the embodiments of the specification, the first two-dimensional code and the at least one other two-dimensional code in the server represent two-dimensional codes of the same user on different applications, the first two-dimensional code serves as an "index," and through one first two-dimensional code, the first client can obtain all other two-dimensional codes bound to the first two-dimensional code, thereby achieving "one code for multiple uses."

Furthermore, when the third-party server searches for other two-dimensional codes bound to the first two-dimensional code according to the first two-dimensional code, the querying or searching manner may include, but is not limited to, the following manners, for example, obtaining binding identification information corresponding to the first two-dimensional code, and searching for other two-dimensional codes bound to the first two-dimensional code through the binding identification information. In an exemplary implementation, two-dimensional codes having the same binding identification information may be searched in a local database of the third-party server, and whether these two-dimensional codes having the same binding identification information are other two-dimensional codes bound to the first two-dimensional code is determined, which improves the efficiency of searching for other two-dimensional codes bound to the first two-dimensional code by the third-party server. In an exemplary operating process, different users correspond to different binding identification information. Therefore, when searching for other two-dimensional codes bound to the first two-dimensional code according to the binding identification information, two-dimensional codes of different users that are bound to each other will not be queried.

Furthermore, after the third-party server obtains all other two-dimensional codes bound to the first two-dimensional code, the third-party server sends all other two-dimensional codes to the first client. Since the first client needs to obtain detailed two-dimensional code information from the application server corresponding to the first client when recognizing the two-dimensional code information, the user needs to manually select a two-dimensional code corresponding to the first client from all the other two-dimensional codes received by the first client, which increases the redundant operations of the user. To solve the above problem, the third-party server analyzes, when searching for other two-dimensional codes bound to the first two-dimensional code according to the binding identification information, the two-dimensional code query request to obtain the client identification information of the first client comprised in the two-dimensional code query request, determines two-dimensional codes corresponding to the client identification information of the first client from the other two-dimensional codes bound to the first two-dimensional code, and returns the two-dimensional codes corresponding to the client identification information of the first client to the first client, which reduces the manual operations of the user.

In current technologies, when two-dimensional codes are printed on a person's business cards, two-dimensional codes corresponding to a variety of clients would be all printed on this person's business cards to ensure that all information could be included on the business cards, affecting the aesthetic design of the business cards. With the method above, a person's business cards can be printed with only one two-dimensional code, which both ensures that all personal information be disclosed, and ensures the aesthetic design of the person's business cards. The present embodiment does not have limitations on the implementation scenarios.

Furthermore, when the third-party server establishes a binding relationship between the first two-dimensional code and the at least one other two-dimensional code, the third-party server stores the first two-dimensional code and the at least one other two-dimensional code to the local database, adds binding identification information to the first two-dimensional code and the at least one other two-dimensional code in the local database, respectively, and establishes a binding relationship between the first two-dimensional code and the at least one other two-dimensional code through the binding identification information. It should be noted that the third-party server needs to separately add binding identification information to the first two-dimensional code and the at least one other two-dimensional code, to achieve mutual binding between the first two-dimensional code and at least one other two-dimensional code. Namely, the third-party server can search other two-dimensional codes through the binding identification information of the first two-dimensional code, and the third-party server can also obtain the first two-dimensional code through any one of other two-dimensional codes. Referring to Table 1 again, user A requests the third-party server to bind two-dimensional codes corresponding to client I, client II, and client III, the third-party server adds binding identification requests to two-dimensional code a, two-dimensional code 001, and two-dimensional code C-01, respectively, to achieve mutual binding between the first two-dimensional code and at least one other two-dimensional code.

Furthermore, to inform the second client user that the third-party server has successfully established a binding relationship between the first two-dimensional code and the at least one other two-dimensional code, the third-party server sends prompt information of successful establishment of the two-dimensional code binding relationship to the second client after establishing the binding relationship between the first two-dimensional code and the at least one other two-dimensional code.

Figure 3:
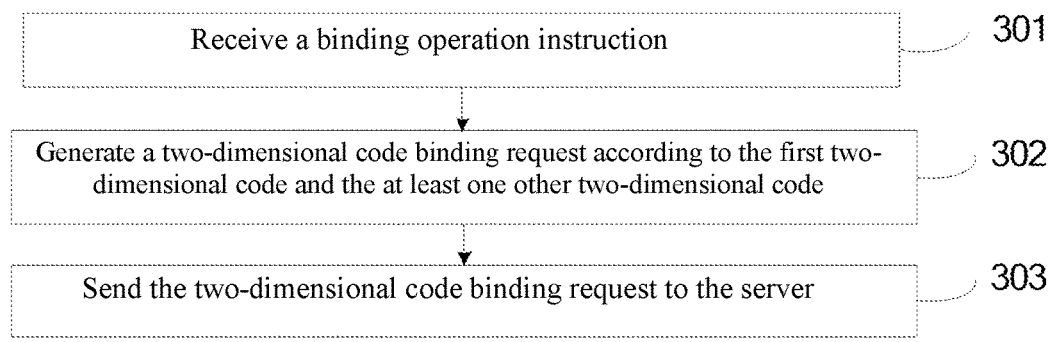
FIG. 3 is a flow chart of a second two-dimensional code information query method according to some embodiments of the specification.

Furthermore, the embodiments of the specification further provide a two-dimensional code information query method applied at the client side. As shown in FIG. 3, the method comprises:

Step 301. Receiving a binding operation instruction.

The binding operation instruction comprises a first two-dimensional code and at least one other two-dimensional code to be bound with the first two-dimensional code, and the first two-dimensional code and the at least one other two-dimensional code representing two-dimensional codes of the same user on different applications.

By triggering a function button of a two-dimensional code binding service in a second client, a user sends the binding operation instruction to the second client, such that the second client activates the two-dimensional code binding service according to the binding operation instruction and establishes communication connection with a third-party server.

Figure 4:
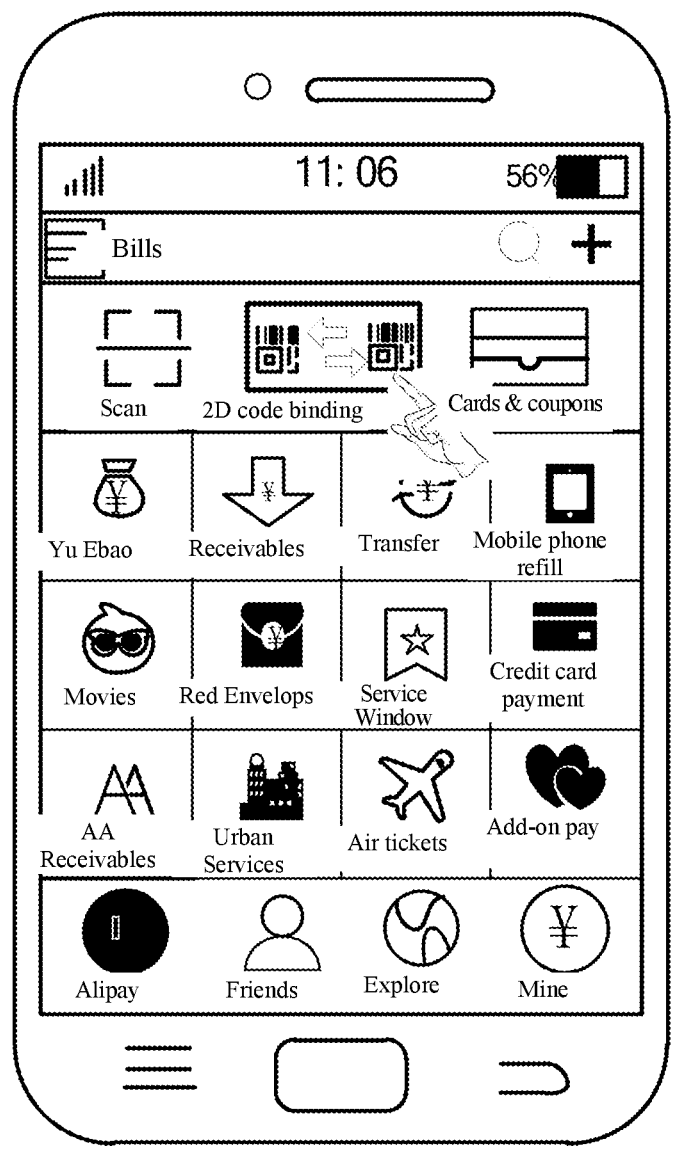
FIG. 4 is a schematic diagram of activating a two-dimensional code binding service according to some embodiments of the specification.

For example, FIG. 4 is a schematic diagram of activating a two-dimensional code binding service according to some embodiments of the specification, wherein the client is installed in a smart phone. When the user triggers the function button of the two-dimensional code binding service shown in FIG. 4, communication connection is established with a third-party server. FIG. 4 is merely an example, and the embodiments of the specification do not have limitations on the particular position of the two-dimensional code binding service in the client, the particular type of the client, and the installation carrier of the client.

Step 302. Generating a two-dimensional code binding request according to the first two-dimensional code and the at least one other two-dimensional code.

After the second client establishes communication connection with the third-party server, the second client obtains the first two-dimensional code and at least one other two-dimensional code to be bound with the first two-dimensional code, and generates a two-dimensional code binding request according to the first two-dimensional code and the at least one other two-dimensional code to be bound with the first two-dimensional code, wherein the two-dimensional code binding request comprises the first two-dimensional code and the at least one other two-dimensional code. The manner in which the second client obtains the first two-dimensional code and at least one other two-dimensional code to be bound with the first two-dimensional code may include, but is not limited to, the following manners, for example, the second client recognizes at least one other two-dimensional code to be bound with the first two-dimensional code through scanning; alternatively, if at least one other two-dimensional code to be bound with the first two-dimensional code is stored in a photo album of the carrier installed with the second client, the second client selects, through invoking the photo album function of the carrier installed with the second client, at least one other two-dimensional code to be bound with the first two-dimensional code. The second client may adopt any one of the above manners to obtain at least one other two-dimensional code to be bound with the first two-dimensional code, which is not limited by the embodiments of the specification.

In an exemplary application, when the second client obtains at least one other two-dimensional code to be bound with the first two-dimensional code, the second client may request a binding of the two-dimensional code corresponding to the second client and two-dimensional codes corresponding to other clients; alternatively, the second client may also request a binding of two-dimensional codes corresponding to at least two other clients (excluding the second client).

Step 303. Sending the two-dimensional code binding request to the server.

Furthermore, after the second client sends the two-dimensional code binding request to the third-party server and after the third-party server responds to the two-dimensional code binding request, the second client receives and displays prompt information of successful establishment of a binding relationship between the first two-dimensional code and the at least one other two-dimensional code sent by the third-party server. As an implementation manner of the embodiments of the specification, when the second client displays the prompt information, the successful establishment of the two-dimensional code binding relationship is indicated by texts, such as "the two-dimensional codes have been successfully bound!" As another implementation manner of the embodiments of the specification, before the third-party server sends the prompt information to the second client, the third-party server generates an association identification two-dimensional code and sends the association identification two-dimensional code to the second client. The second client receives the association identification two-dimensional code sent by the third-party server so as to use the association identification two-dimensional code. In an exemplary implementation process, the second client user can print the association identification two-dimensional code on carriers like personal business card, newspapers, magazines, books, and bags. The embodiments of the specification do not have limitations on particular scenarios in which the association identification two-dimensional code is used by the second client.

Figure 5:
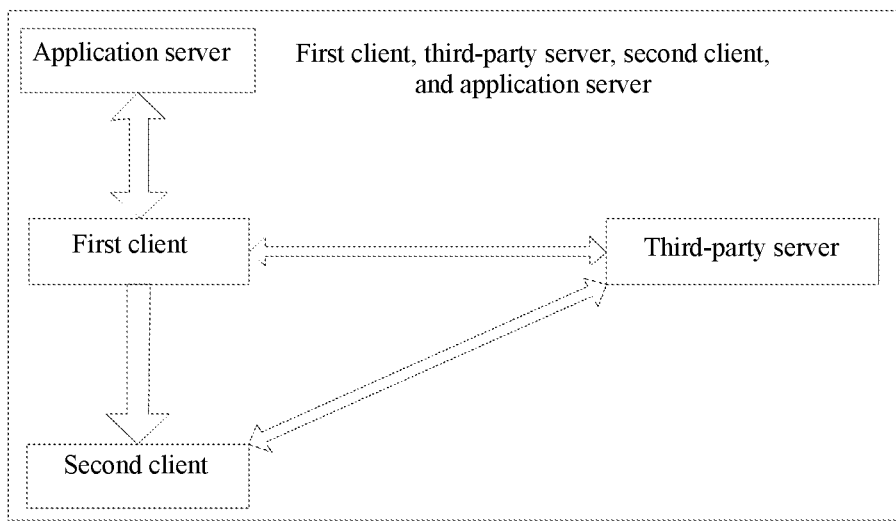
FIG. 5 is a schematic diagram of interactions between a second client, a third-party server, a first client, and an application server according to some embodiments of the specification.

Furthermore, interactions between the third-party server, the first client, the second client, and the application server corresponding to the first client have been described in detail above. Communication relationship between the first client, the third-party server, the second client, and the application server corresponding to the first client will be described briefly through a figure. For example, FIG. 5 is a schematic diagram of interactions between a second client, a third-party server, a first client, and an application server corresponding to the first client according to some embodiments of the specification. As shown in FIG. 5, the first client and the third-party server conduct mutual communications, the second client and the first client conduct one-way communications, the second client and the third-party server conduct mutual communications, and the first client and the application server corresponding to the first client conduct mutual communications.

Figure 6:
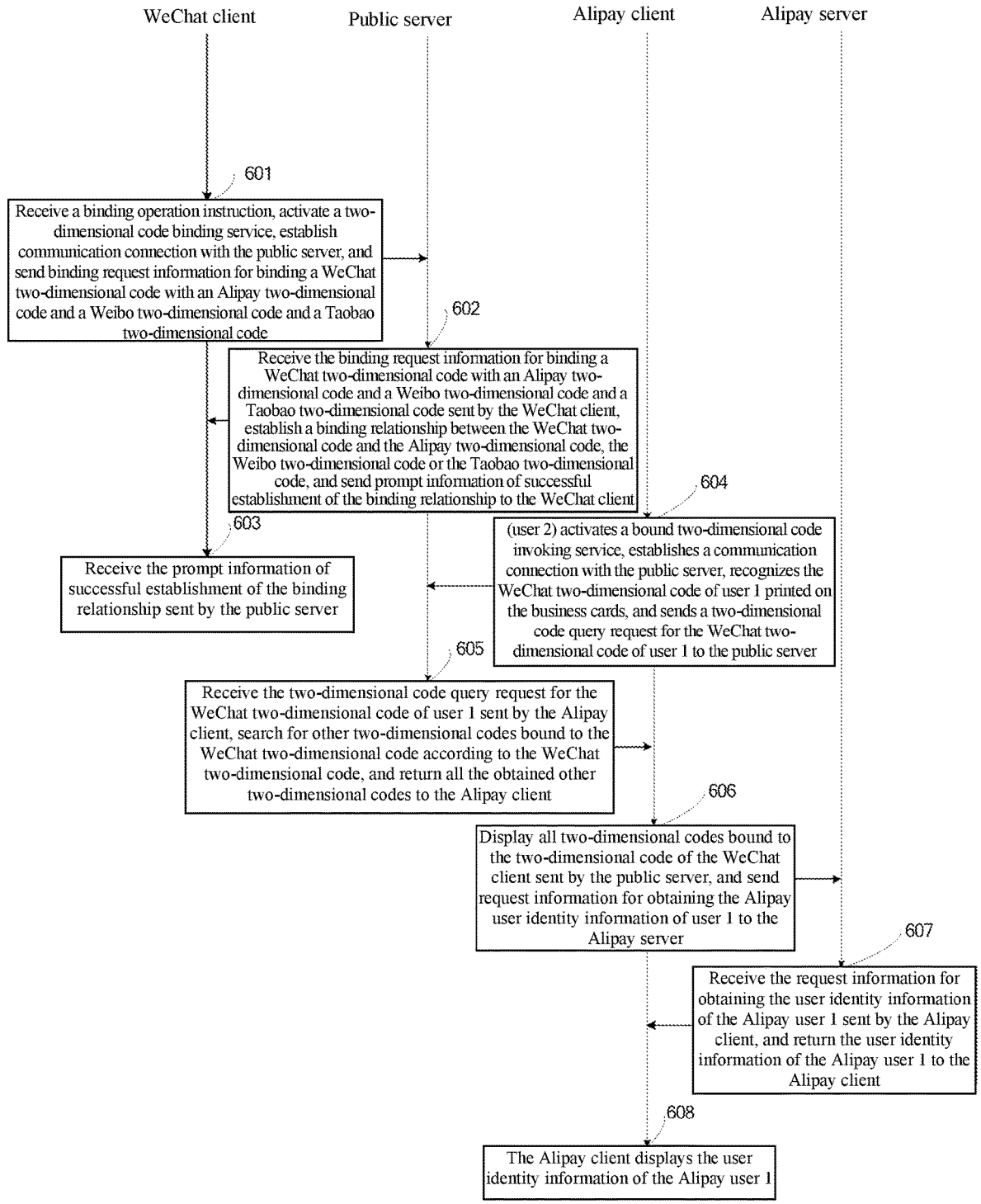
FIG. 6 is a flow chart of a third two-dimensional code information query method according to some embodiments of the specification.

An embodiment will be provided below, which will use WeChat, a public server, Alipay, and an Alipay server as an example to describe a complete process of interactions between WeChat, the public server, Alipay, and the Alipay server. As shown in FIG. 6, the method comprises:

Step 601. A WeChat client receives a binding operation instruction, activates a two-dimensional code binding service, establishes communication connection with the public server, and sends binding request information for binding a WeChat two-dimensional code with an Alipay two-dimensional code, a Weibo two-dimensional code, and a Taobao two-dimensional code.

Step 602. The public server receives the binding request information for binding a WeChat two-dimensional code with an Alipay two-dimensional code, a Weibo two-dimensional code and a Taobao two-dimensional code sent by the WeChat client, establishes a binding relationship between the WeChat two-dimensional code and the Alipay two-dimensional code, between the WeChat two-dimensional code and the Weibo two-dimensional code, and between the WeChat two-dimensional code and the Taobao two-dimensional code, and sends prompt information of successful establishment of the binding relationship to the WeChat client.

Step 603. The WeChat client receives the prompt information of successful establishment of the binding relationship sent by the public server.

Upon receiving the prompt information of successful establishment of the binding relationship, the WeChat client user 1 prints the two-dimensional code of the WeChat client user on the user's business cards, such that other users add the user 1 as a friend by recognizing the two-dimensional code.

Step 604. The Alipay client (user 2) activates a bound two-dimensional code invoking service, establishes a communication connection with the public server, recognizes the WeChat two-dimensional code of user 1 printed on the business cards, and sends a two-dimensional code query request for the WeChat two-dimensional code of user 1 to the public server.

User 2 recognizes the WeChat two-dimensional code of user 1 printed on the business cards by activating the bound two-dimensional code invoking service.

Step 605. The public server receives the two-dimensional code query request for the WeChat two-dimensional code of user 1 sent by the Alipay client, searches for other two-dimensional codes bound to the WeChat two-dimensional code according to the WeChat two-dimensional code, and returns all the obtained other two-dimensional codes to the Alipay client.

The public server will send the Alipay two-dimensional code, the Weibo two-dimensional code, and the Taobao two-dimensional code bound to the WeChat two-dimensional code of user 1. These two-dimensional codes bound with the WeChat two-dimensional code of user 1 all belong to user 1.

Step 606. The Alipay client displays all two-dimensional codes bound to the two-dimensional code of the WeChat client sent by the public server, and sends request information for obtaining the Alipay user identity information of user 1 to the Alipay server.

User 2 selects an Alipay two-dimensional code corresponding to user 1 on the Alipay user interface, and sends, by long pressing the Alipay two-dimensional code, request information for obtaining the corresponding two-dimensional code information (user identity information) to the Alipay server.

Step 607. The Alipay server receives the request information for obtaining the user identity information of the Alipay user 1 sent by the Alipay client, and returns the user identity information of the Alipay user 1 to the Alipay client.

Step 608. The Alipay client displays the user identity information of the Alipay user 1.

Furthermore, as implementation of the method shown in FIG. 1 and FIG. 3 above, some other embodiments of the specification further provide a server. The apparatus embodiments correspond to the above method embodiments. For the purpose of easy reading, the details in the above method embodiments will not be repeated one by one in the apparatus embodiments. However, it should be clear that the apparatus in the embodiments can correspondingly implement all content of the above method embodiments.

Figure 7:
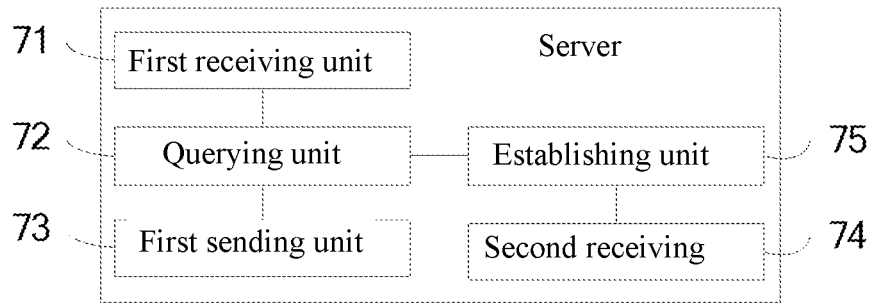
FIG. 7 is a block diagram of a server according to some embodiments of the specification.

The embodiments of the specification further provide a server. As shown in FIG. 7, the server comprises:

a first receiving unit 71 configured to receive a two-dimensional code query request sent by a first client, the two-dimensional code query request containing a first two-dimensional code;

a querying unit 72 configured to search for, according to the first two-dimensional code received by the first receiving unit 71, other two-dimensional codes bound to the first two-dimensional code;

a first sending unit 73 configured to return the other two-dimensional codes found by the querying unit 72 to the first client so that the first client displays the returned other two-dimensional codes, and obtains corresponding two-dimensional code information by recognizing the other two-dimensional codes with corresponding applications;

a second receiving unit 74 configured to receive a two-dimensional code binding request sent by a second client, the two-dimensional code binding request containing the first two-dimensional code and at least one other two-dimensional code, and the first two-dimensional code and the at least one other two-dimensional code representing two-dimensional codes of the same user on different applications; and an establishing unit 75 configured to establish a binding relationship between the first two-dimensional code and the at least one other two-dimensional code received by the second receiving unit 74.

Figure 8:
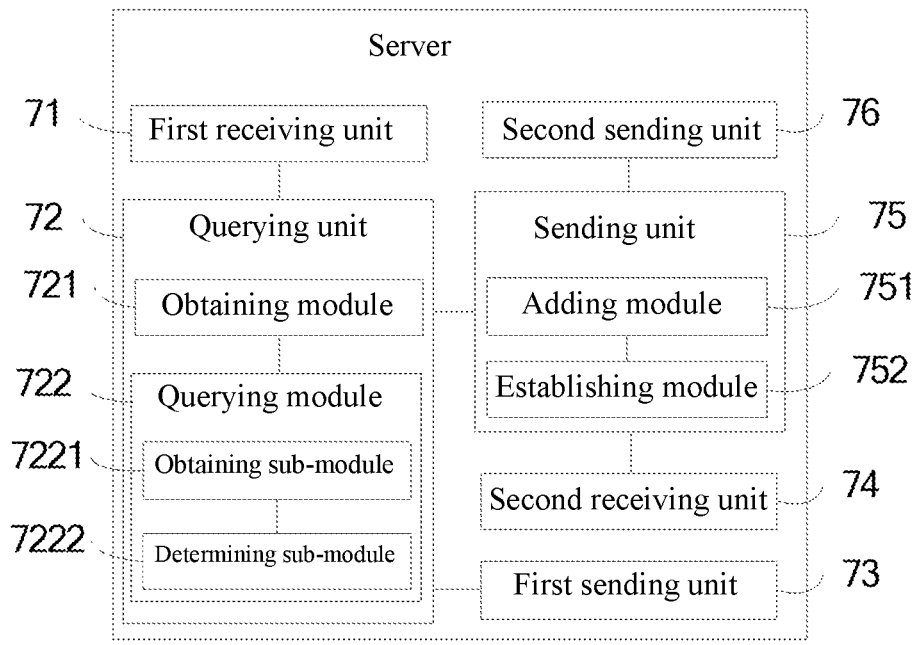
FIG. 8 is a block diagram of another server according to some embodiments of the specification.

Furthermore, as shown in FIG. 8, the querying unit 72 comprises:

an obtaining module 721 configured to obtain binding identification information corresponding to the first two-dimensional code; and a querying module 722 configured to search for or search for other two-dimensional codes bound to the first two-dimensional code through the binding identification information.

Furthermore, as shown in FIG. 8, the querying module 722 comprises:

an obtaining sub-module 7221 configured to obtain client identification information of the first client comprised in the two-dimensional code query request;

a determining sub-module 7222 configured to determine a two-dimensional code corresponding to the client identification information of the first client obtained by the obtaining sub-module 7221 from other two-dimensional codes bound to the first two-dimensional code; and the first sending unit 73 further configured to return the two-dimensional code corresponding to the client identification information of the first client found by the querying unit 72 to the first client.

Furthermore, as shown in FIG. 8, the establishing unit 75 comprises:

an adding module 751 configured to add binding identification information to the first two-dimensional code and the at least one other two-dimensional code, respectively;

an establishing module 752 configured to establish a binding relationship between the first two-dimensional code and the at least one other two-dimensional code through the binding identification information added by the adding module 751.

Furthermore, as shown in FIG. 8, the server further comprises:

a second sending unit 76 configured to send, to the second client, prompt information of successful establishment of a binding relationship after the establishing unit 75 establishes the binding relationship between the first two-dimensional code and the at least one other two-dimensional code.

Furthermore, the first two-dimensional code is printed on a business card.

Figure 9:
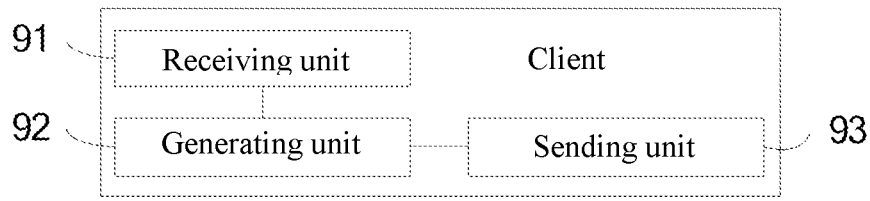
FIG. 9 is a block diagram of a client according to some embodiments of the specification.

Furthermore, the embodiments of the specification further provide a client. As shown in FIG. 9, the client comprises:

a receiving unit 91 configured to receive a binding operation instruction, the binding operation instruction comprising a first two-dimensional code and at least one other two-dimensional code to be bound with the first two-dimensional code, and the first two-dimensional code and the at least one other two-dimensional code representing two-dimensional codes of the same user on different applications;

a generating unit 92 configured to generate a two-dimensional code binding request according to the first two-dimensional code and the at least one other two-dimensional code received by the receiving unit 91, the two-dimensional code binding request containing the first two-dimensional code and the at least one other two-dimensional code; and a sending unit 93 configured to send the two-dimensional code binding request generated by the generating unit 92 to a server.

Figure 10:
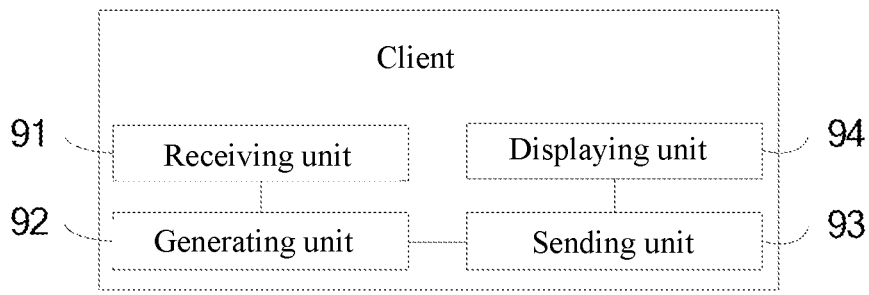
FIG. 10 is a block diagram of another client according to some embodiments of the specification.

Furthermore, as shown in FIG. 10, the client further comprises:

a displaying unit 94 configured to display prompt information of successful establishment of a binding relationship between the first two-dimensional code and the at least one other two-dimensional code sent by the server after the sending unit 93 sends the two-dimensional code binding request to the server.

Figure 11:
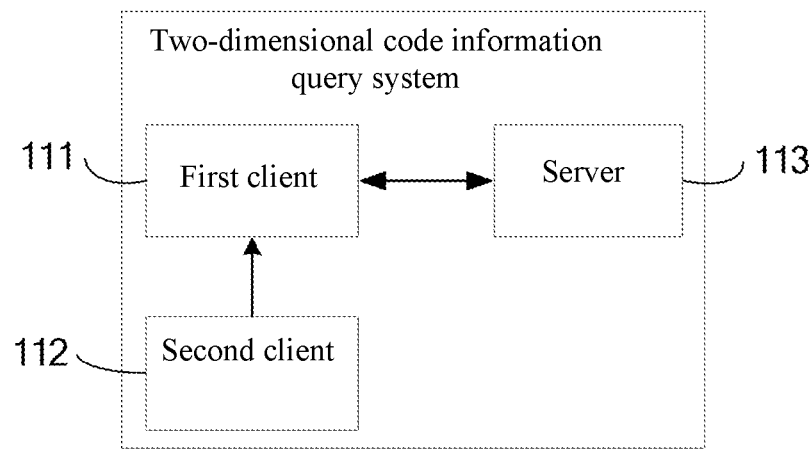
FIG. 11 is a block diagram of a two-dimensional code information query system according to some embodiments of the specification.

Furthermore, the embodiments of the specification further provide a two-dimensional code information query system. As shown in FIG. 11, the system comprises: a first client 111, a second client 112, and a server 113, wherein the second client 112 is configured to receive a binding operation instruction, the binding operation instruction comprising a first two-dimensional code and at least one other two-dimensional code to be bound with the first two-dimensional code, generate a two-dimensional code binding request according to the first two-dimensional code and the at least one other two-dimensional code, and send the two-dimensional code binding request to the server 113; here, the first two-dimensional code and the at least one other two-dimensional code represent two-dimensional codes of the same user on different applications, and the two-dimensional code binding request contains the first two-dimensional code and the at least one other two-dimensional code;

the server 113 is configured to receive the two-dimensional code binding request sent by the second client 112, and establish a binding relationship between the first two-dimensional code and the at least one other two-dimensional code;

the first client 111 is configured to send a two-dimensional code query request to the server 113, the two-dimensional code query request containing a first two-dimensional code;

the server 113 is further configured to receive the two-dimensional code query request sent by the first client 111, search for other two-dimensional codes bound to the first two-dimensional code according to the first two-dimensional code, and return the obtained other two-dimensional codes to the first client 111; and the first client 111 is further configured to receive and display the other two-dimensional codes returned by the server 113, such that corresponding two-dimensional code information is obtained by recognizing the other two-dimensional codes with corresponding applications.

According to the server, client, and two-dimensional code information query system provided by the specification, the server receives a two-dimensional code binding request sent by a second client, the two-dimensional code binding request comprising a first two-dimensional code and at least one other two-dimensional code, and establishes a binding relationship between the first two-dimensional code and the at least one other two-dimensional code; the server receives a two-dimensional code query request comprising the first two-dimensional code sent by a first client, searches for, according to the first two-dimensional code, other two-dimensional codes bound to the first two-dimensional code in the established binding relationship between the first two-dimensional code and the at least one other two-dimensional code, and returns all the obtained other two-dimensional codes to the first client, so that the first client displays the returned other two-dimensional codes. In the embodiments of the specification, the first two-dimensional code and the at least one other two-dimensional code in the server represent two-dimensional codes of the same user on different applications, the first two-dimensional code serves as an "index," and through one first two-dimensional code, the first client can obtain all other two-dimensional codes bound to the first two-dimensional code, thereby achieving "one code for multiple uses."

It should be noted that, with regard to the above server, functions of all units and modules used in the embodiments of the specification can be implemented through a hardware processor.

Figure 12:
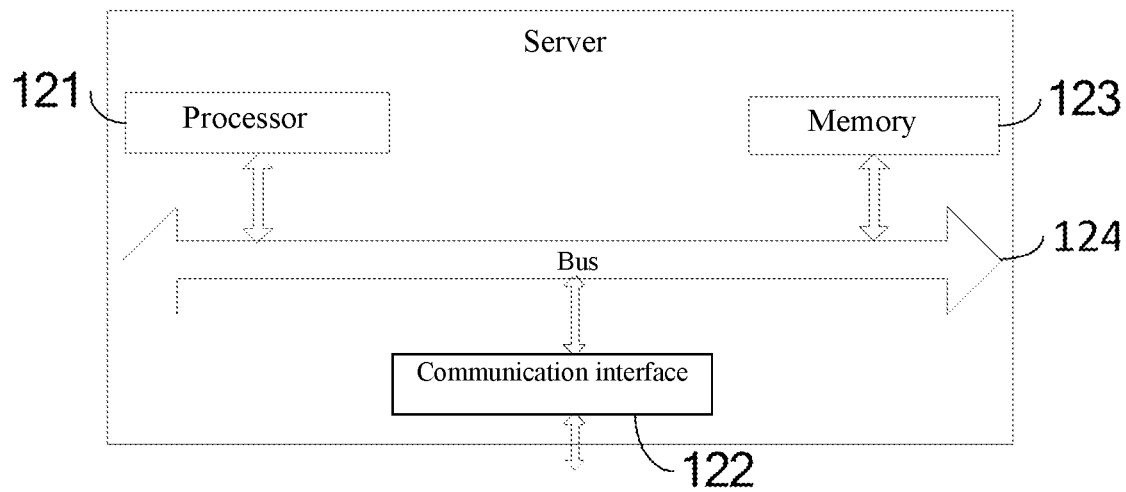
FIG. 12 is a schematic structural diagram of a server according to some embodiments of the specification.

For example, FIG. 12 is a schematic structural diagram of a server according to some embodiments of the specification. The server can comprise a processor 121, a communication interface 122, a memory 123, and a bus 124, wherein the processor 121, the communication interface 122, and the memory 123 conduct mutual communications via the bus 124. The communication interface 122 can be used for information transmission between the server and the clients. The processor 121 can invoke logic instructions in the memory 123 to execute the following method: receiving a two-dimensional code query request sent by a first client, the two-dimensional code query request containing a first two-dimensional code; according to the first two-dimensional code, searching for other two-dimensional codes bound to the first two-dimensional code; returning the obtained other two-dimensional codes to the first client so that the first client displays the returned other two-dimensional codes, and obtains corresponding two-dimensional code information by recognizing the other two-dimensional codes with corresponding applications; wherein the first two-dimensional code being bound to the other two-dimensional codes comprises: receiving a two-dimensional code binding request sent by a second client, the two-dimensional code binding request containing the first two-dimensional code and at least one other two-dimensional code, and the first two-dimensional code and the at least one other two-dimensional code representing two-dimensional codes of the same user on different applications; and establishing a binding relationship between the first two-dimensional code and the at least one other two-dimensional code.

Furthermore, when the above logic instructions in the memory 123 can be implemented in the form of software functional units and sold or used as independent products, the logic instructions can be stored in a computer readable storage medium. On the basis of this understanding, the technical solution of the specification substantially, or a part of the technical solution of the specification that contributes to current technologies, or a part of the technical solution can be embodied in the form of a software product. The computer software product is stored in a storage medium, comprising several instructions to enable a computer device (which may be a personal computer, a server, or a network device) to execute all or some steps of the methods of the embodiments of the specification. The above storage medium comprises various media capable of storing program codes, such as a USB flash drive, a mobile hard drive, a Read-Only Memory (ROM), a Random Access Memory (RAM), a magnetic disk, or an optical disk. A person skilled in the art should understand that the embodiments of the present application may be provided as a method, a system, or a computer program product. Therefore, the present application may be implemented as a complete hardware embodiment, a complete software embodiment, or an embodiment combing software and hardware. Moreover, the present application may be in the form of a computer program product implemented on one or more computer usable storage media (including, but not limited to, a magnetic disk memory, CD-ROM, an optical memory, and the like) comprising computer usable program codes.

The present application is described with reference to the flow charts and/or block diagrams of the method, apparatus, and computer program product illustrated in the embodiments of the present application. It should be understood that every process and/or block of the flow charts and/or block diagrams and a combination of processes and/or blocks of the flow charts and/or block diagrams can be implemented by computer program instructions. These computer program instructions can be provided to a general-purpose computer, a dedicated computer, an embedded processor, or a processor of another programmable data processing device, thereby producing a machine and causing these instructions to, when executed by the computer or the processor of another programmable data processing device, produce an apparatus for implementing functions specified in one or more processes in the flow charts and/or one or more blocks in the block diagrams.

These computer program instructions can also be stored in a computer readable storage medium capable of guiding a computer or other programmable data processing devices to work in a particular manner, such that the instructions stored in the computer readable storage medium produce a manufactured article that includes an instruction device for implementing functions specified in one or more processes in the flow charts and/or one or more blocks in the block diagrams.

These computer program instructions can also be loaded onto a computer or other programmable data processing devices, causing a series of operating steps to be executed on the computer or other programmable data processing devices to produce a process of computer implementation, thereby enabling instructions executed on the computer or other programmable data processing devices to implement functions specified in one or more processes in the flow charts and/or one or more blocks in the block diagrams.

In a typical configuration, a computation device includes one or more processors (CPUs), input/output interfaces, network interfaces, and a memory.

The memory may include computer readable media, such as a volatile memory, a Random Access Memory (RAM), and/or a non-volatile memory, e.g., a Read-Only Memory (ROM) or a flash RAM. The memory is an example of a computer readable medium.

Computer readable media include permanent, volatile, mobile and immobile media, which can implement information storage through any method or technology. The information may be computer readable instructions, data structures, program modules or other data. Examples of storage media of computers include, but are not limited to, Phase-change RAMs (PRAMs), Static RAMs (SRAMs), Dynamic RAMs (DRAMs), other types of Random Access Memories (RAMs), Read-Only Memories (ROMs), Electrically Erasable Programmable Read-Only Memories (EEPROMs), flash memories or other memory technologies, Compact Disk Read-Only Memories (CD-ROMs), Digital Versatile Discs (DVDs) or other optical memories, cassettes, cassette and disk memories or other magnetic memory devices or any other non-transmission media, which can be used for storing information accessible to a computation device. According to the definitions in the description, the computer readable media do not include transitory media, such as modulated data signals and carriers.

Only embodiments of the present application are described above, which are not used to limit the present application. To a person skilled in the art, the present application may have various modifications and changes. Any modification, equivalent substitution or improvement made within the spirit and principle of the present application shall be encompassed by the claims of the specification.

The invention claimed is:

1. A two-dimensional code query method, comprising:
receiving a binding operation instruction from a first client, the binding operation instruction comprising a plurality of two-dimensional codes to be bound together, wherein all of the plurality of two-dimensional codes are associated with one user, and wherein each of the plurality of two-dimensional codes is associated with a different payment application;
responsive to receiving the binding operation instruction, establishing a binding relationship between the plurality of two-dimensional codes;
receiving a two-dimensional code query request from a second client, the two-dimensional code query request containing a first one of the plurality of two-dimensional codes;
responsive to receiving the two-dimensional code query request, obtaining at least one second one of the plurality of two-dimensional codes based on the binding relationship and the first one of the plurality of two-dimensional codes; and
returning the obtained at least one second one of the plurality of two-dimensional codes to the second client, wherein the second client extracts payment information of the one user from the obtained at least one second one of the plurality of two-dimensional codes with a corresponding payment application on the second client.

2. The method of claim 1, wherein the obtaining at least one second one of the plurality of two-dimensional codes that are bound to the first one of the plurality of two-dimensional codes comprises:
obtaining binding identification information corresponding to the first two-dimensional code; and
querying two-dimensional codes to obtain the two-dimensional codes that are bound to the first one of the plurality of two-dimensional codes through the binding identification information.

3. The method of claim 1, wherein the obtaining at least one second one of the plurality of two-dimensional codes that are bound to the first one of the plurality of two-dimensional codes comprises:
obtaining user identification information comprised in the first one of the plurality of two-dimensional codes, and obtaining at least one two-dimensional code that is bound to the first one of the plurality of two-dimensional codes based on the user identification information.

4. The method of claim 1, wherein the first one of the plurality of two-dimensional codes is printed on a business card.

5. A non-transitory computer-readable storage medium configured with instructions executable by one or more processors to cause the one or more processors to perform operations comprising:
receiving a binding operation instruction from a first client, the binding operation instruction comprising a plurality of two-dimensional codes to be bound together, wherein all of the plurality of two-dimensional codes are associated with one user, and wherein each of the plurality of two-dimensional codes is associated with a different payment application;
responsive to receiving the binding operation instruction, establishing a binding relationship between the plurality of two-dimensional codes;
receiving a two-dimensional code query request from a second client, the two-dimensional code query request containing a first one of the plurality of two-dimensional codes;
responsive to receiving the two-dimensional code query request, obtaining at least one second one of the plurality of two-dimensional codes based on the binding relationship and the first one of the plurality of two-dimensional codes; and
returning the obtained at least one second one of the plurality of two-dimensional codes to the second client, wherein the second client extracts payment information of the one user from the obtained at least one second one of the plurality of two-dimensional codes with a corresponding payment application on the second client.

6. The non-transitory computer-readable storage medium of claim 5, wherein the obtaining at least one second one of the plurality of two-dimensional codes that are bound to the first one of the plurality of two-dimensional codes comprises:
    obtaining binding identification information corresponding to the first two-dimensional code; and
    querying two-dimensional codes to obtain the two-dimensional codes that are bound to the first one of the plurality of two-dimensional codes through the binding identification information.

7. The non-transitory computer-readable storage medium of claim 5, wherein the obtaining at least one second one of the plurality of two-dimensional codes that are bound to the first one of the plurality of two-dimensional codes comprises:
    obtaining user identification information comprised in the first one of the plurality of two-dimensional codes, and obtaining at least one two-dimensional code that is bound to the first one of the plurality of two-dimensional codes based on the user identification information.

8. The non-transitory computer-readable storage medium of claim 5, wherein the first one of the plurality of two-dimensional codes is printed on a business card.

9. A two-dimensional code query system, comprising:
    one or more processors; and
    a non-transitory computer-readable storage medium configured with instructions executable by the one or more processors to cause the one or more processors to perform operations comprising:
        receiving a binding operation instruction from a first client, the binding operation instruction comprising a plurality of two-dimensional codes to be bound together, wherein all of the plurality of two-dimensional codes are associated with one user, and wherein each of the plurality of two-dimensional codes is associated with a different payment application;
        responsive to receiving the binding operation instruction, establishing a binding relationship between the plurality of two-dimensional codes;
        receiving a two-dimensional code query request from a second client, the two-dimensional code query request containing a first one of the plurality of two-dimensional codes;
        responsive to receiving the two-dimensional code query request, obtaining at least one second one of the plurality of two-dimensional codes based on the binding relationship and the first one of the plurality of two-dimensional codes; and
        returning the obtained at least one second one of the plurality of two-dimensional codes to the second client, wherein the second client extracts payment information of the one user from the obtained at least one second one of the plurality of two-dimensional codes with a corresponding payment application on the second client.

10. The system of claim 9, wherein the obtaining at least one second one of the plurality of two-dimensional codes that are bound to the first one of the plurality of two-dimensional codes comprises:
    obtaining binding identification information corresponding to the first two-dimensional code; and
    querying two-dimensional codes to obtain the two-dimensional codes that are bound to the first one of the plurality of two-dimensional codes through the binding identification information.

11. The system of claim 9, wherein the obtaining at least one second one of the plurality of two-dimensional codes that are bound to the first one of the plurality of two-dimensional codes comprises:
    obtaining user identification information comprised in the first one of the plurality of two-dimensional codes, and obtaining at least one two-dimensional code that is bound to the first one of the plurality of two-dimensional codes based on the user identification information.

12. The system of claim 9, wherein the first one of the plurality of two-dimensional codes is printed on a business card.

* * * * *